United States Patent [19]
Maier et al.

[11] Patent Number: 5,740,842
[45] Date of Patent: Apr. 21, 1998

[54] VENTING DEVICE FOR VEHICLE FUEL TANKS

[75] Inventors: Josef Maier, Hepberg; Dieter Simon, Treuchtlingen; Wolfgang Liebhart, Treuchtlingen; Thomas Theuer, Treuchtlingen; Klaus Müller, Oberscheinfeld; Rolf Walter, Stuttgart; Dieter Scheürenbrandt, Wolfschlungen; Manfred Weil, Schorndorf; Wolfgang Freiwald, Aichwald; Gerhard Kiermaier, Stuttgart, all of Germany

[73] Assignees: Walter Alfmeier GmbH + Co. Präzisions-Baugruppenelemente, Treuchtlingen; Mercedes Benz AG, Stuttgart, both of Germany

[21] Appl. No.: 602,245

[22] Filed: Feb. 16, 1996

[30] Foreign Application Priority Data

Feb. 17, 1995 [DE] Germany ............ 295 02 621.9

[51] Int. Cl.$^6$ .................................... B65B 31/00
[52] U.S. Cl. .................. 141/45; 141/44; 141/59; 141/307; 220/86.2; 137/588
[58] Field of Search ................... 141/44, 45, 59, 141/302, 303, 307; 220/86.2; 137/587, 588, 589; 128/911; 138/113, 114

[56] References Cited

U.S. PATENT DOCUMENTS

| 4,699,638 | 10/1987 | Harris | 220/86.2 |
| 4,941,587 | 7/1990 | Terada | 220/86.2 |
| 5,375,633 | 12/1994 | Bucci | 220/86.2 |
| 5,540,266 | 7/1996 | Grau et al. | 141/383 |

FOREIGN PATENT DOCUMENTS

| 3605893 | 8/1986 | Germany. | |
| 4012368 | 5/1992 | Germany. | |
| 43 42 962 C1 | 2/1995 | Germany | 141/383 |

*Primary Examiner*—Henry J. Recla
*Assistant Examiner*—Timothy L. Maust
*Attorney, Agent, or Firm*—Spencer & Frank

[57] ABSTRACT

A fuel tank arrangement for a motor vehicle. The arrangement includes a fuel tank containing fuel therein and having a gas space disposed above the fuel, and a venting device connected to the fuel tank. The venting device includes an activated charcoal filter and a venting conduit connecting the gas space to the activated charcoal filter for establishing gas communication therebetween. A stop valve is disposed in the venting conduit and is adapted to open gas communication between the gas space and the activated charcoal filter during refueling. Moreover, a fuel separator is disposed in the venting conduit for separating fuel from a gas flow through the venting conduit thereby yielding separated fuel.

18 Claims, 7 Drawing Sheets

VENTING DEVICE FOR VEHICLE FUEL TANKS

BACKGROUND OF THE INVENTION

Field of the Invention

The invention relates to a venting device for vehicle fuel tanks with a disposal of refueling emissions on the part of the vehicle.

Venting devices of this kind are used to vent the fuel tank when refueling. The fuel vapors or the fuel vapor/air mixture found in the gas space disposed above the level of the fuel must naturally be able to escape from the tank so that it can be filled with fuel. Normally, there is a venting conduit for venting, which connects the gas space of the fuel tank to an activated charcoal filter. This measure prevents fuel vapors from reaching the environment. So that fuel vapors cannot escape outward through the filling conduit which usually exists on a fuel tank, a seal must be provided during the refueling process, between the inner wall of the filling conduit and the gas pump nozzle which is inserted into the its filling opening. Venting devices of this kind are disclosed for example in DE 40 12 368 C2 and DE 36 05 893 A1. In venting devices, generally a stop valve is disposed in the venting conduit in order to prevent fuel from reaching the activated charcoal filter via the venting conduit in the event of an accident in which the vehicle comes to rest upside down. This stop valve is normally closed and opens only during refueling.

Despite these stop valves in prior art venting devices, fuel is not prevented from reaching the activated charcoal filter via the venting conduit. This danger exists in particular during the filling of the fuel tank or when shutting off the gas pump nozzle, when a high internal tank pressure peak or a shut-off pressure peak occur. In the event of the above, the fuel can travel via the venting conduit, as far as the stop valve and, since this is open, can penetrate further to the activated charcoal filter. The result of an overflow of fuel into the activated charcoal filter is that the filter becomes unusable.

SUMMARY OF THE INVENTION

Based on the above, the overriding object of the invention is to propose a venting device which prevents the overflow of fuel in vapor or liquid form.

According to one embodiment of the invention a fuel separator is disposed in the venting conduit which connects the gas space of the fuel tank to an activated charcoal filter. In a completely general way, this is understood to be a liquid separator. As a result, fuel which is contained in liquid form or as liquid mist in the vapor/air mixture escaping from the fuel tank (referred to below as venting.gas) is retained, before reaching the activated charcoal filter. A liquid or fuel separation can be achieved very simply as a result of the fact that a plurality of obstacles are built into the venting conduit in the form of walls protruding into the venting gas flow. But there are also conceivable separators which operate according to the centrifugal principal. A separation of liquid can also be carried out as a result of a slowing down of the venting gas flow being provided.

According to a further embodiment of the invention, the fuel retained by the separator is returned to the tank in a suitable manner by means of a corresponding line, etc. As a result, the fuel separator is practically maintenance-free.

An improvement which is advantageous and novel in and of itself generally concerns the disposition of components

2 which are associated with the venting device, that is, the stop valve, the venting conduit, and if need be, the fuel separator, inside the fuel tank. In this manner, the possibility of fuel escaping is virtually ruled out. In conventional venting devices, for example according to DE 36 05 893 A1, both the stop valve and the lines which constitute the venting conduit are disposed outside the tank. As a result, fuel can escape outward and reach the environment via the walls of the venting lines and in particular via connecting points, for example between the activated charcoal filter and the venting line. The only fuel connecting point of the above kind in the venting device according to one embodiment of the invention is between the activated charcoal filter and the venting conduit. However, even a connecting point such as the one above can be eliminated if the activated charcoal filter is directly connected to the fuel tank according to a further embodiment of the invention.

The fuel separator and the stop valve are advantageously combined into one structural unit, namely a filler neck, which is disposed on the upper end of a filling pipe, serving as the filling conduit. The assembly of the device according to the invention is simplified in this manner. The multi-functional structural unit embodied in the shape of a filler neck can be completely prefabricated and needs only to be inserted into the filling pipe. The filler neck is advantageously embodied as a section of a pipe, whose outer circumference, together with the inner circumference of the filling pipe, defines an approximately hollow-cylindrical receiving space for the fuel separator and the stop valve. The advantage of the above measure consists of the fact that an installation space is produced in a very simple manner, which would otherwise have had to be additionally produced on the filling pipe for example by means of a corresponding shaping thereof. Because the above receiving space is sealed in relation to both the fuel tank and the the region outside of the fuel tank, fuel is prevented from getting into the receiving space and from reaching the activated charcoal filter from the receiving space via the stop valve and the venting conduit, for example when the tank is filled to the top. Likewise, no fuel can reach the receiving space from the refueling end, for example when the gas pump nozzle is already actuated before being inserted into the filling conduit. The seal in relation to the outside region of the fuel tank and to the inner space of the tank is assured in a way which is advantageous for technical manufacture and assembly reasons. In particular, sealing flanges are formed respectively onto the upper and lower end of the filler neck, which flange rests sealingly against the inner wall of the filling conduit or filling pipe, at least with their outer edge.

In an advantageous embodiment, the fuel separator is constituted by deflecting walls, which protrude in an approximately radial direction from the outer circumference of the filler neck and rest in an essentially gas-tight manner against the inner wall of the filling pipe or the filling conduit. The separator conduit formed in this manner is similar to a labyrinth in that it presents a labyrinthine path to the flow of gases therein. The separator conduit further constitutes an interposed portion of the venting conduit being connected on one end to a first portion of the vent and on the other, to a second portion of the venting conduit, the first portion extending from the gas space to the fuel separator and the second portion extending from the fuel separator to the activated charcoal filter. The first section of the venting conduit, which is in the form of a supply line, is connected to the separator conduit via an existing inlet opening in the lower sealing flange, and the second section of the venting conduit, which is in the form of a removal line, is connected to the separator conduit via an outlet opening also disposed in the lower sealing flange.

The return of the fuel separated in the fuel separator preferably occurs because there is a return opening in the separator conduit, which opening feeds into the filling conduit. This filling opening is disposed at a lower point than the inlet opening.

The stop valve includes a closing element, disposed in the receiving space. The closing element is acted upon in the closing direction by a spring, and cooperates with the outlet opening in the lower sealing flange. The closing element can further be moved back and forth in a guide conduit between a stop position and an opening position in which position the venting conduit is open. The guide conduit comprises the inner wall of the filling conduit and a limiting wall tangentially formed on the outer circumference of the filler neck. The type of valve housing usually required for a stop valve is therefore unnecessary according to the invention. Consequently, the manufacture cost for the stop valve is practically comprised of merely producing a closing element and preparing a spring. The closing element has a shape which complements the cross sectional shape of the guide conduit. It is therefore guided by the limiting wall mentioned above and the inner wall of the filling conduit. Additional guide means, such as guide ribs, etc. are therefore not necessary in the present invention. Because the filler neck is disposed eccentrically in the filling pipe or filling conduit, the receiving space is larger on one side of the filler neck. Preferably the stop valve is disposed in this enlarged part. The rotationally fixed disposition of the filler neck in the form of a positive engagement connection assures that a gas cap can be attached without the filler neck rotating in relation to the filling pipe. In another embodiment of the invention, the filler neck is disposed in a separate housing which can be connected to the filling conduit. The advantage of the above measure lies primarily in that one and the same structural unit, which is comprised of the housing mentioned, the filler neck, and the closing element acted on by a spring, can be used for variously embodied fuel tanks or vehicle types.

BRIEF DESCRIPTION OF THE DRAWINGS

The invention will now be explained in detail in conjunction with the accompanying drawings.

Shown are in.

DETAILED DESCRIPTION OF THE INVENTION

Figure 1:
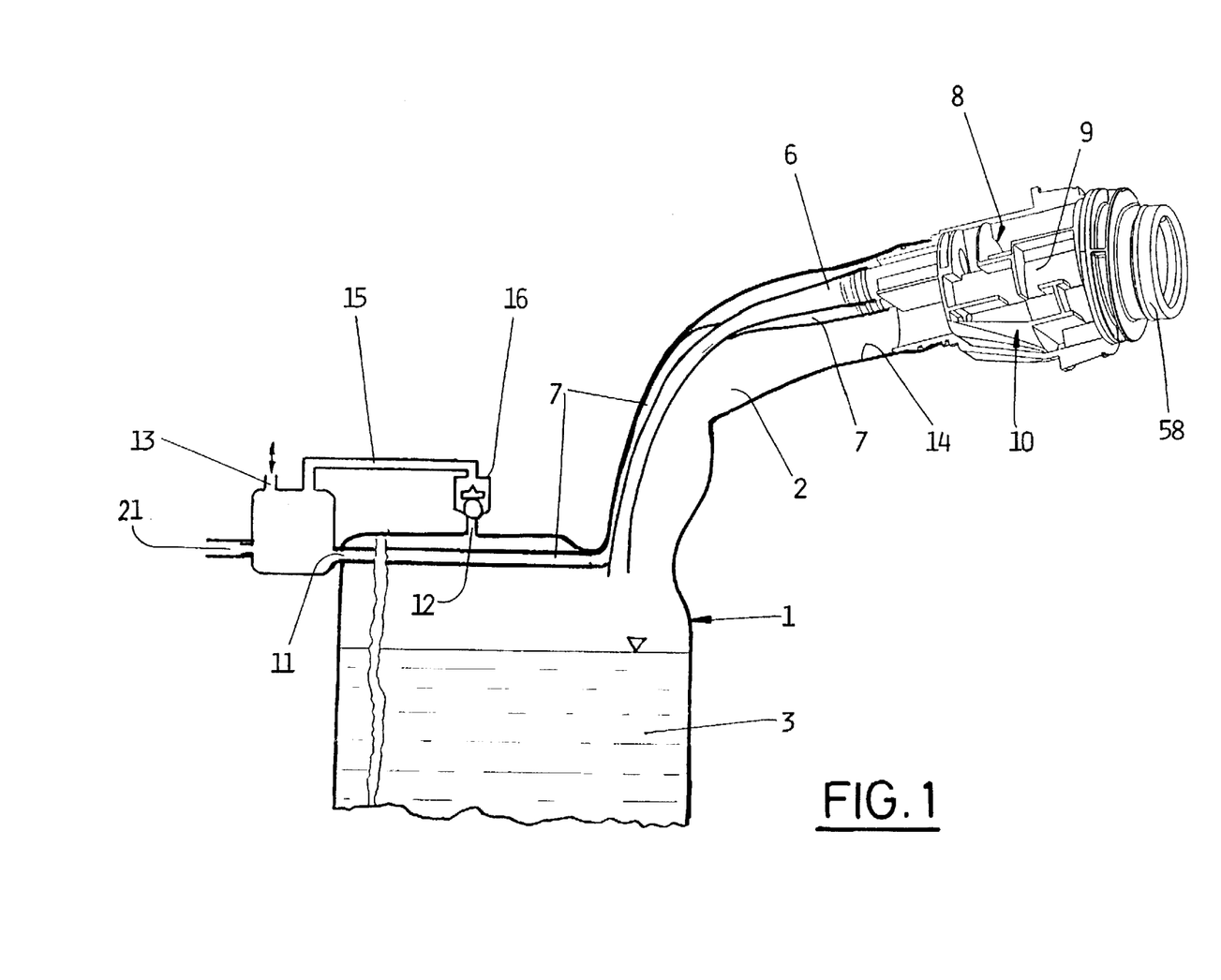
FIG. 1, a schematic view of a preferred embodiment of a venting device according to the invention.

FIG. 1 schematically depicts a fuel tank 1 which includes a venting device according to the invention. A filling conduit 2 is disposed in a normal manner on the fuel tank, by means of which conduit the fuel tank 1 can be filled with fuel 3. Depending upon the fill level, there is a more or less large gas space 4 above the fuel 3, which space contains a fuel vapor/air mixture, or venting gas for short. The gas space 4 communicates with an activated charcoal filter 5 disposed outside the fuel tank 3. The venting line is composed of two portions, namely a supply line 6 and a removal line 7. The supply line 6 connects the gas space 4 to a fuel separator 9. A stop valve 8 is connected to the fuel separator 9, as is explained in further detail below. This valve is connected on the outlet side to a removal line 7 which leads to the activated charcoal filter 5. The stop valve 8 and the fuel separator 9 are integral parts of a structural unit disposed in the venting fueling conduit 2, namely a filler neck 10. The supply line 6 and the removal line 7 are disposed inside the fuel tank 3 or the filling conduit 2. Only the end 11 of the removal line 7 used for connecting to the activated charcoal filter 5 is guided outward through a wall of the fuel tank.

The venting device according to the invention functions as follows: when refueling, the fuel level rises, by means of which the gas space shrinks and the venting gas disposed in it is displaced into the supply line 6. A displacement outward is prevented since the filler neck 10 sealingly rests against the inner wall 14 of the filling conduit 2, as is demonstrated more precisely below. The stop valve 8 is normally closed and is opened only during refueling. The stop valve can be controlled in practically any manner, for example via the gas cap or via a gas pump nozzle inserted into the filling conduit. When the stop valve is open, the venting gas can travel via the supply line 6 to the fuel separator 9, from there to the open stop valve 8, and finally via the removal line 7, can reach the activated charcoal filter 5, which it leaves in a purified form via a venting opening 13. The activated charcoal filter 5 adsorptively retains the fuel vapor contained in the venting gas. The regeneration of the activated charcoal filter is carried out via an intake line 21, which is connected to the intake side of the vehicle motor. When closed, the stop valve 8 prevents liquid fuel from reaching the activated charcoal filter 5 via the venting line or via the supply line 6 and the removal line 7.

In addition to the venting device which is effective during refueling, another one is provided at the fuel tank 1, namely an operational venting. A venting opening 12 on the top end of the fuel tank is connected to the activated charcoal filter 5 via an operational venting line 15. A float valve or roll-over valve 16 is disposed in the operational venting line 15 or also directly in the venting opening 12. When the gas cap and hence stop valve 8 is closed, fuel vapor can travel via the roll-over valve 16 and the operational venting line 15 to the activated charcoal filter 5, for example when the fuel expands due to heating. Conversely, air is taken into the fuel tank via the venting opening 13 in the activated charcoal filter when the level of fuel decreases.

Figure 2:
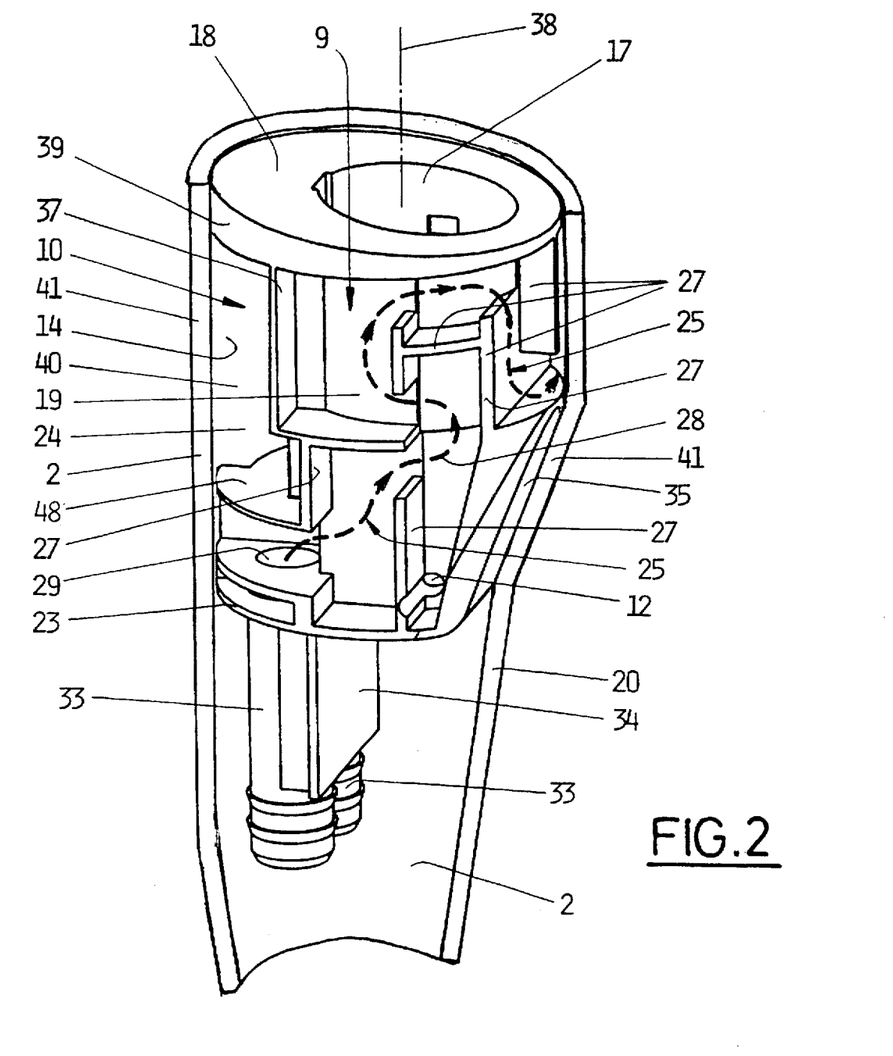
FIG. 2 a side elevational view of namely a filler neck including a fuel separator and a stop valve.

FIG. 2 shows the upper region of a filling pipe 20, which constitutes the filling conduit 2, with the filler neck 10 disposed inside it. The filler neck 10 is essentially a pipe section whose inner space is used as a pump nozzle receptacle 17. In its installed position, the upper end of the filler neck 10 has a sealing flange 18, which extends away from the outer circumference 19 of the filler neck 10 approximately at right angles and rests in an essentially gas-tight manner with its outer edge against the inner wall 14 of the filling pipe 20. Another sealing flange 23 is disposed on the lower end of the filler neck 10, which flange extends away from the outer circumference 19 of the filler neck 10 approximately at right angles and rests in an essentially gas-tight manner against the inner wall 14 of the filling pipe 20. A receiving space 24 is produced in this manner, which is disposed between the inner wall 14 and the outer circumference 19. The fuel separator 9 and the stop valve 8 are disposed in this receiving space 24. According to the invention, these parts are not separate components, but are constituted by the embodiment of the filler neck 10 which is described below.

The fuel separator 9 essentially is a separator conduit 25, which is disposed on the outer circumference 19 of the filler neck 10 and is twisted like a labyrinth. The separator conduit 25 is constituted by deflecting plates 27, which protrude in an approximately radial direction from the outer circumference 19. The deflecting plates 27 rest sealingly against the inner wall 14 of the filling pipe 20 with their end faces. In this manner, a conduit is formed, which for example has the course indicated by the dashed line 28.

Figure 3:
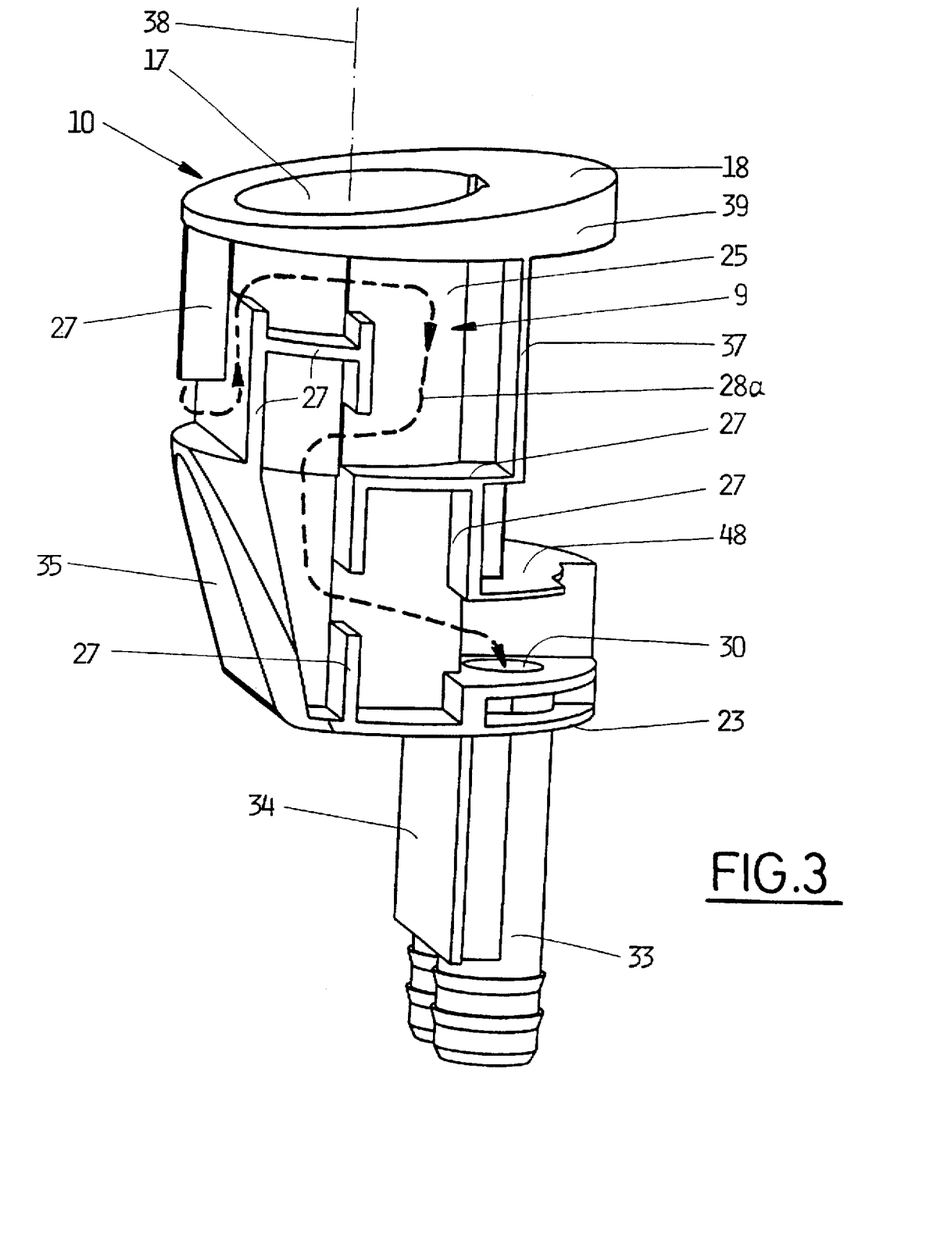
FIG. 3 a side elevational view the filler neck according to FIG. 2 in a view rotated by 180°.

The lower sealing flange 23 is penetrated by two through openings, namely a supply opening 29 and an outlet opening 30 (see FIG. 3). The openings mentioned feed into two connection fittings 33 formed on the underside of the lower sealing flange 23. The connection fittings 33 are used to connect the supply line 6 and the removal line 7 and extend approximately at right angles to the sealing flange 23. Moreover, a support wall 34 is formed on its underside, which wall extends parallel to the connection fittings 33 and is connected to them and of one piece with them.

An oblique wall 35 is formed on the outer circumference 19 of the filler neck 10, which wall cooperates with a complementarily embodied wall section 41 of the filling pipe 20 in the form of a positive engagement connection. In this manner, the filler neck 10 is disposed in the filling pipe 20 in a rotationally fixed manner and in addition, its intended rotational position inside the filling pipe 20 is preset.

During refueling, the venting gas from the gas space 4 of the fuel tank 1 is displaced into the separator conduit 25 by means of the supply line 6 and the supply opening 29. At the supply opening 29, the gas approximately assumes the course shown in FIG. 2 with the dashed line 28 the fuel separated in the conduit 25 is returned to the filling conduit via return opening R. In FIG. 3, the filler neck 10 is shown as having been rotated by 180° so that its side disposed toward the back in FIG. 2 is visible. Here, the separator conduit 25 also extends like a labyrinth via the outer circumference 19 of the filler neck 10. The course of a venting gas flowing through separator conduit 25 is indicated with the dashed line 28a. The tips of the arrows in the dashed line 28 (FIG. 2) and 28a (FIG. 3) indicate the flow direction of the venting gas. The upstream end of the separator conduit 25 with regard to this flow direction feeds into the outlet opening 30 in the lower sealing flange 23. The outlet opening 30 is open only when refueling and is otherwise closed. The stop valve 8 used for this purpose is left out in FIGS. 2 and 3 for reasons of clarity and is now described below in conjunction with FIGS. 4 and 5.

Figure 4:
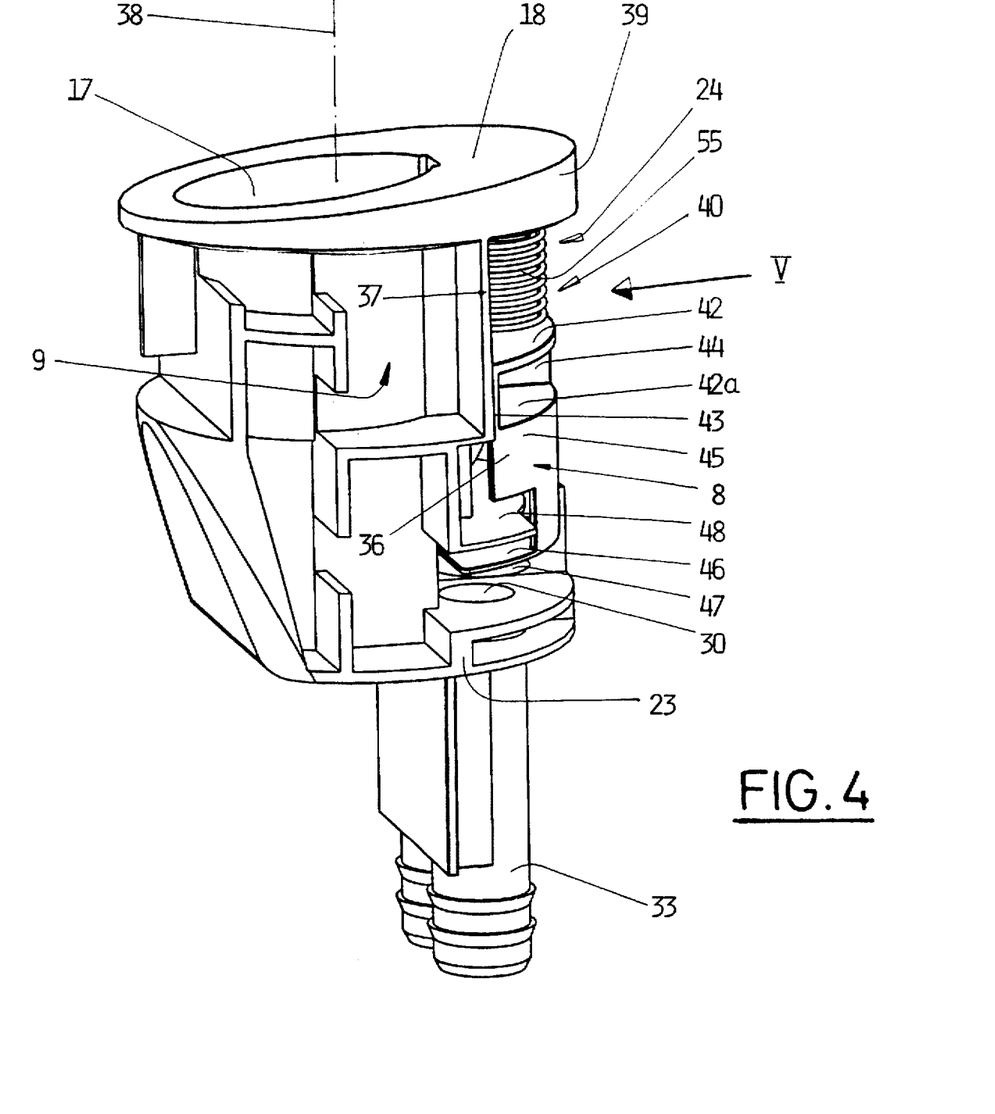
FIG. 4 a side elevational view of the filler neck according to FIG. 3, including closing element.
Figure 5:
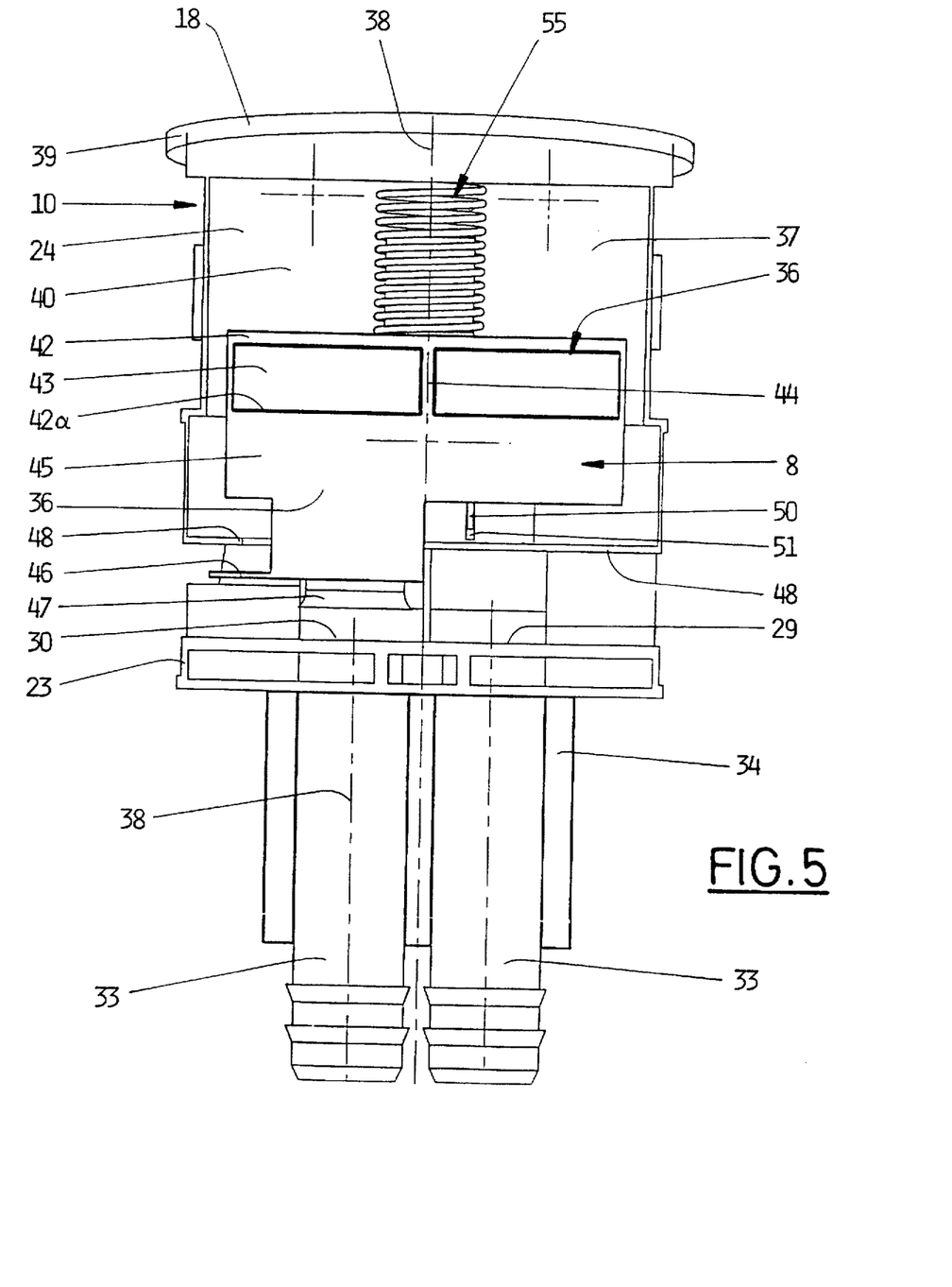
FIG. 5 a side elevational view of the filler neck according to FIG. 4 in the direction of arrow V.

FIG. 4 shows a filler neck 10 in the rotational position according to FIG. 3. The stop valve 8 contains a closing element 36 which is disposed in the receiving space 24 and can be moved between a closed position which closes outlet opening 30 and an open position which unblocks the opening mentioned. A limiting wall 37 is formed on the outer circumference 19 of the filler neck and extends in the direction of the longitudinal axis 38 of the filler neck 10 and tangential to its outer circumference 19. The limiting wall 37 extends in the tangential direction until it reaches the imaginary envelope cylinder, which extends from the outer edge 39 of the upper sealing flange 18, that is wall 37 extends to the inner wall 14 of the filling pipe (FIG. 2). Thus in the assembled state, the limiting wall 37, with its lateral edges, adjoins the inner wall 14 of the filling pipe 20 (FIG. 2). On its lower end, the limiting wall 37 is bent approximately at right angles and transitions into a deflecting plate 27. A guide conduit 40 for the closing element 36, which conduit has the cross sectional shape of a section of a circle, is formed by the limiting wall 37 and the inner wall of the filling pipe 20. The closing element 36 is essentially a section of a cylinder. Therefore, viewed from the top, in the direction of the longitudinal axis 38 of the filler neck, it has the shape of a section of a circle. It can therefore be moved in the guide conduit 40 enclosed by the limiting wall 37 and the inner wall 14, in the direction of the longitudinal axis 38, but is fixed laterally with respect to this direction. In order to save weight and material, the closing element 36 is not embodied as a solid part, but is composed of various flat parts in the form of walls. Thus, closing element 36 is comprised essentially of two plates 42, 42a, which are in the shape of sections of a circle and, in the assembled state according to FIG. 4, each of these plates extends with its end face lateral to the longitudinal axis 38. The two plates 42, 42a, which are the shape of sections of a circle, are disposed spaced apart from and parallel to each other and are connected to each other by means of a connecting wall 43. The two plates 42, 42a and the connecting wall 43 consequently form a U-profile in the longitudinal section in the direction of the longitudinal axis 38. A support wall 44 is disposed centrally between the plates 42, 42a, which wall extends away from the connecting wall 43 at right angles. The connecting wall 43 cooperates with the limiting wall 37 in the sense of a sliding guidance. An apron 45 is formed onto the approximately circular, curved edge of the lower plate 42a. Viewed in the assembled state, the region of the apron 45 associated with the outlet opening 30 is elongated toward the bottom and at its lower end, is bent approximately at right angles in the direction of the outer circumference 19 of the filler neck 10. The bent part or the part which protrudes inward is a carrier 46 and engages behind a lateral wall 48 which is formed on the outer circumference 19 of the filler neck 10 and which extends away radially from the outer circumference 19 and laterally to the longitudinal axis 38. This lateral wall constitutes an end position stop for the closing element in its open position, which stop cooperates with the carrier 46.

Figure 7:
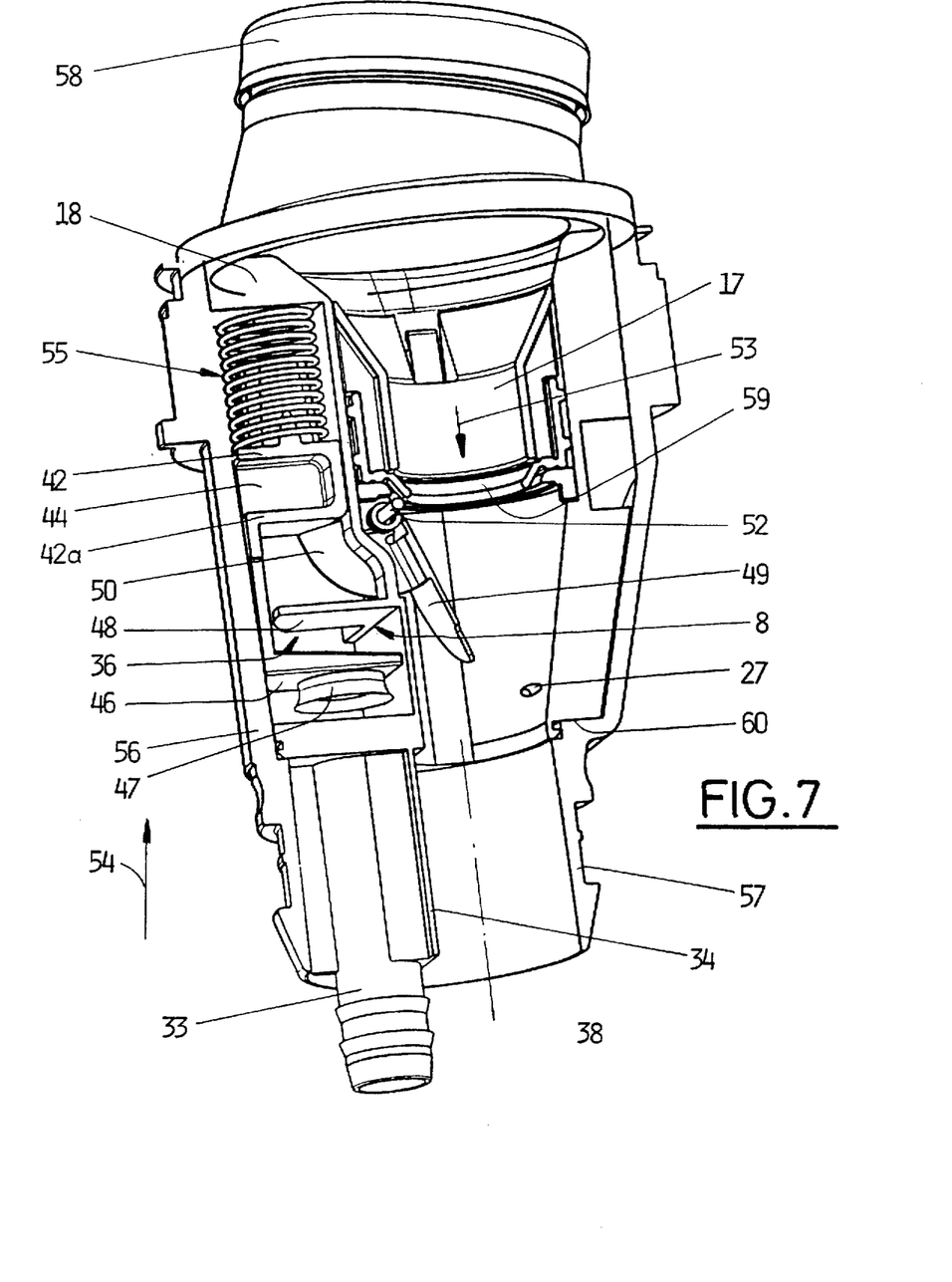
FIG. 7 a partially sectional view of the filler neck according to FIG. 6.

The actuation of the closing element is explained below in conjunction with FIG. 7A double-armed, angled lever arm is disposed in the filler neck 10, whose one lever arm projects into the pump nozzle receptacle 17 and is embodied as a closing flap 49. The closing flap 49 closes the pump nozzle receptacle 17 and is used as a so-called unleaded flap. With one end thereof the flap rests in a closed state against a lip-shaped annular seal 59, which protrudes obliquely inward from the inner circumference of the gas tank nozzle receptacle 17. Two lever arms 50 are formed onto the closing flap 49. The lever arms 50 are plate-shaped and extend with their end faces approximately crosswise to the end face of the closing flap 49. The lever arms 50 protrude into the receiving space 24 via two through slots 51 see also (FIG. 5) and engage behind the lower plate 42a of the closing element 36, which plate is the shape of a section of a circle. The closing flap 49 or the lever arms 50 can be pivoted around a pivot axis 52, which extends approximately at right angles to the longitudinal axis 38 of the filler neck 10. If a gas pump nozzle is inserted into the pump nozzle receptacle 17 in the direction of the arrow 53, the lever arms 50 are moved upward in the direction of the arrow 54. The result is that the closing element is moved into its open position in the direction of the arrow 54, counter to the spring action of a coil spring 55 supported on the upper sealing flange 18 and the upper plate 42, which is in the shape of a section of a circle. The sealing element 47 is lifted off from the outlet opening 30. The communication is then opened between the gas space 4 and the activated charcoal filter 5.

Figure 6:
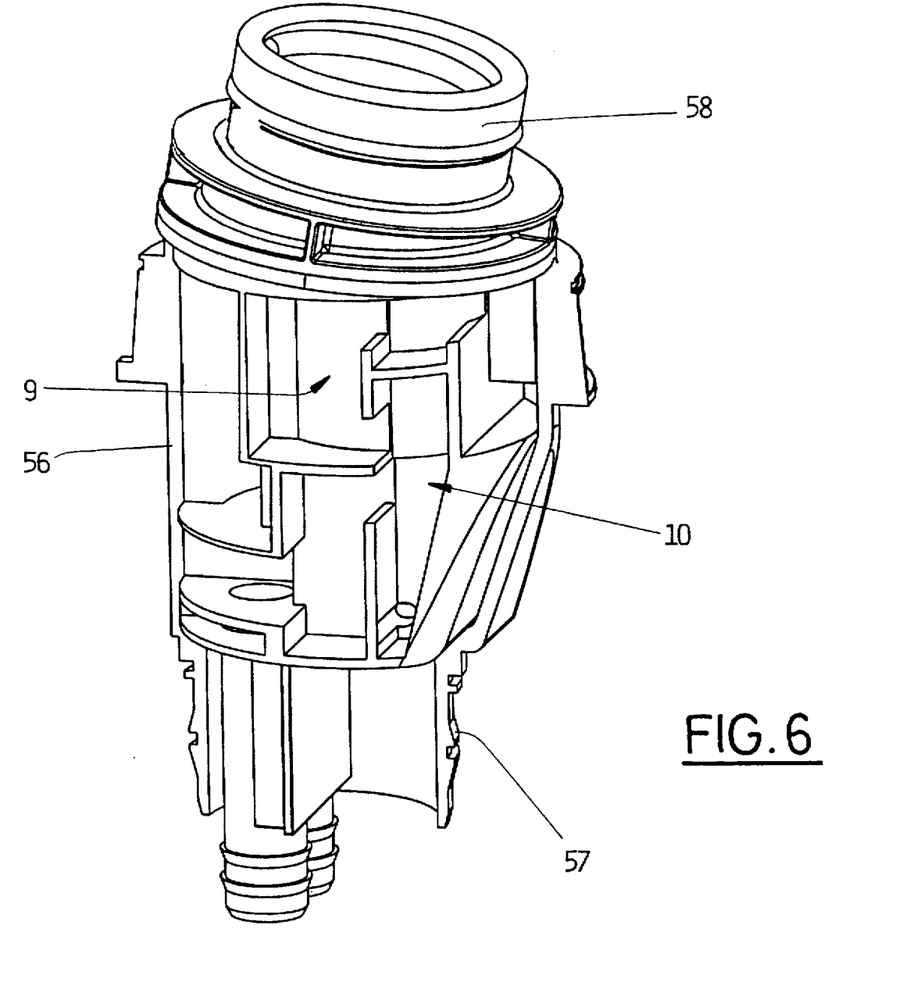
FIG. 6 a side elevational view of a venting device according to the invention, disposed in a separate housing and equipped with a threaded neck.

In the exemplary embodiment shown in FIG. 6, the filler neck is not disposed inside the filling pipe of a fuel tank, but in a separate housing 56, which is essentially the shape of a pipe section. The part of the housing disposed beneath the lower sealing flange 23 is narrowed to a collar 57, which is used for fastening to the filling pipe 20 of a vehicle tank. The sealing flange 23 is supported on an annular shoulder 60, which protrudes inward at the transition to the collar 57. In the exemplary embodiment shown in FIG. 6, a threaded neck 58 is mounted on the upper sealing flange 18, which neck is used to fasten a gas cap (not shown).

We claim:

1. A fuel tank arrangement for a motor vehicle comprising:

a fuel tank adapted to receive fuel therein and having a gas space disposed above the fuel when fuel is received in the fuel tank; and a venting device connected to the fuel tank and comprising:

an activated charcoal filter;

a venting conduit having an end thereof connected to the activated charcoal filter and another end in communication with the gas space for connecting the gas space to the activated charcoal filter thereby establishing gas communication therebetween, the venting conduit being disposed substantially inside the fuel tank, the end of the venting conduit connected to the activated charcoal filter emerging outside of the fuel tank; and a stop valve disposed in the venting conduit and being adapted to open gas communication between the gas space and the activated charcoal filter during refueling.

2. The arrangement according to claim 1, wherein the venting device further comprises a fuel separator disposed in the venting conduit for separating fuel from a gas flow through the venting conduit thereby yielding separated fuel.

3. A fuel tank arrangement for a motor vehicle comprising:

a fuel tank adapted to receive fuel therein and having a gas space disposed above the fuel when fuel is received in the fuel tank; and a venting device connected to the fuel tank and comprising:

an activated charcoal filter; and a venting conduit connecting the gas space to the activated charcoal filter for establishing gas communication therebetween;

a stop valve disposed in the venting conduit and being adapted to open gas communication between the gas space and the activated charcoal filter during refueling; and a fuel separator disposed in the venting conduit for separating fuel from a gas flow through the venting conduit thereby yielding separated fuel;

a filling conduit connected to the fuel tank for filling the fuel tank, the filling conduit having an inner wall and an upper end defining a filling opening;

a single structural unit disposed at the filling opening of the filling conduit and comprising a substantially cylindrical filler neck having an outer circumference and an inner space defining a pump nozzle receptacle therein, the outer circumference of the filler neck and the inner wall of the filling conduit together defining a hollow, substantially cylindrical receiving space therebetween, the fuel separator and the stop valve being disposed in the receiving space, the filler neck being connected to the filling conduit such that its longitudinal axis is offset with respect to a longitudinal axis of the filling conduit.

4. The arrangement according to claim 3, further comprising a sealing means disposed in the filling conduit for sealing the receiving space.

5. The arrangement according to claim 4, wherein the sealing means comprises a plurality of sealing flanges resting sealingly with outer edges thereof against the inner wall of the filling conduit, the plurality of sealing flanges including:

an upper sealing flange formed on an upper end of the filler neck; and a lower sealing flange formed on a lower end of the filler neck.

6. The arrangement according to claim 5, wherein the fuel separator comprises a plurality of deflecting plates protruding from the outer circumference of the filler neck and resting sealingly against the inner wall of the filling conduit, the deflecting plates together defining a separator conduit therebetween presenting a labyrinthine flow path to a gas flow therein.

7. The arrangement according to claim 6, wherein:

the venting conduit includes:

a first portion comprising a supply line extending from the gas space to the filler neck; and a second portion comprising a removal line extending from the filler neck to the activated charcoal filter; and the lower sealing flange defines a supply opening and an outlet opening therein, the supply line being connected to the separator conduit via the supply opening, and the removal line being connected to the separator conduit via the outlet opening.

8. The arrangement according to claim 3, wherein the filler neck positively engages the filling conduit and is thereby rotationally fixed therein.

9. The arrangement according to claim 3, wherein the filler neck comprises a filler neck housing connected to the filling conduit.

10. The arrangement according to claim 3, wherein:

the stop valve includes a closing element disposed in the receiving space and being effective for closing the outlet opening; and the filler neck and the closing element are made of injection molded plastic.

11. A fuel tank arrangement for a motor vehicle comprising:

a fuel tank adapted to receive fuel therein and having a gas space disposed above the fuel when fuel is received in the fuel tank; and a venting device connected to the fuel tank and comprising:

an activated charcoal filter; and a venting conduit connecting the gas space to the activated charcoal filter for establishing gas communication therebetween;

a stop valve disposed in the venting conduit and being adapted to open gas communication between the gas space and the activated charcoal filter during refueling;

a fuel separator disposed in the venting conduit for separating fuel from a gas flow through the venting conduit thereby yielding separated fuel;

a filling conduit connected to the fuel tank for filling the fuel tank, the filling conduit having an inner wall and an upper end defining a filling opening;

a single structural unit disposed at the filling opening of the filling conduit and comprising a substantially cylindrical filler neck having an outer circumference and an inner space defining a pump nozzle receptacle therein, the outer circumference of the filler neck and the inner wall of the filling conduit together defining a hollow, substantially cylindrical receiving space, the fuel separator and the stop valve being disposed in the receiving space, the fuel separator comprising a plurality of deflecting plates protruding from the outer circumference of the filler neck and resting sealingly against the inner wall of the filling conduit, the deflecting plates together defining a separator conduit therebetween presenting a labyrinthine flow path to a gas flow therein; and a sealing means disposed in the filling conduit for sealing the receiving space, the sealing means comprising a plurality of sealing flanges resting sealingly with outer edges thereof against the inner wall of the filling conduit, the plurality of sealing flanges including:

an upper sealing flange formed on an upper end of the filler neck; and a lower sealing flange formed on a lower end of the filler neck;

wherein:

the venting conduit includes:

a first portion comprising a supply line extending from the gas space to the filler neck; and a second portion comprising a removal line extending from the filler neck to the activated charcoal filter; and the lower sealing flange defines a supply opening and an outlet opening therein, the supply line being connected to the separator conduit via the supply opening, and the removal line being connected to the separator conduit via the outlet opening.

12. The arrangement according to claim 11, wherein the filler neck further defines a return opening for the separated fuel, the return opening connecting the separator conduit with the filling conduit and being disposed at a lower position than the supply opening on the filler neck.

13. The arrangement according to claim 11, wherein the stop valve includes:

a closing element disposed in the receiving space; and a spring urging the closing element in a closing direction toward the outlet opening for closing the outlet opening.

14. The arrangement according to claim 13, wherein the venting device further includes a limiting wall formed tangentially on the outer circumference of the filler neck, the limiting wall and the inner wall of the filling conduit together defining a guide conduit therebetween, the closing element being disposed in the guide conduit.

15. The arrangement according to claim 14, wherein the closing element has a cross sectional contour corresponding to a cross sectional shape of the guide conduit in a direction perpendicular to a longitudinal axis of the filler neck.

16. The arrangement according to claim 11, wherein the stop valve includes means for opening the outlet opening only when a gas pump nozzle is inserted into the pump nozzle receptacle.

17. The arrangement according to claim 16, wherein:

the stop valve includes a closing element disposed in the receiving space and being effective for closing the outlet opening; and the means for opening includes a two-armed actuating lever protruding into the pump nozzle receptacle with one arm thereof and being dynamically-coupled to the closing element with another arm thereof, the lever being actuatable by a gas pump nozzle being inserted into the pump nozzle receptacle for actuating the closing element.

18. The arrangement according to claim 17, wherein the lever is a closing flap for substantially covering an inner cross section of the pump nozzle receptacle.

\* \* \* \* \*